United States Patent Office 2,780,662
Patented Feb. 5, 1957

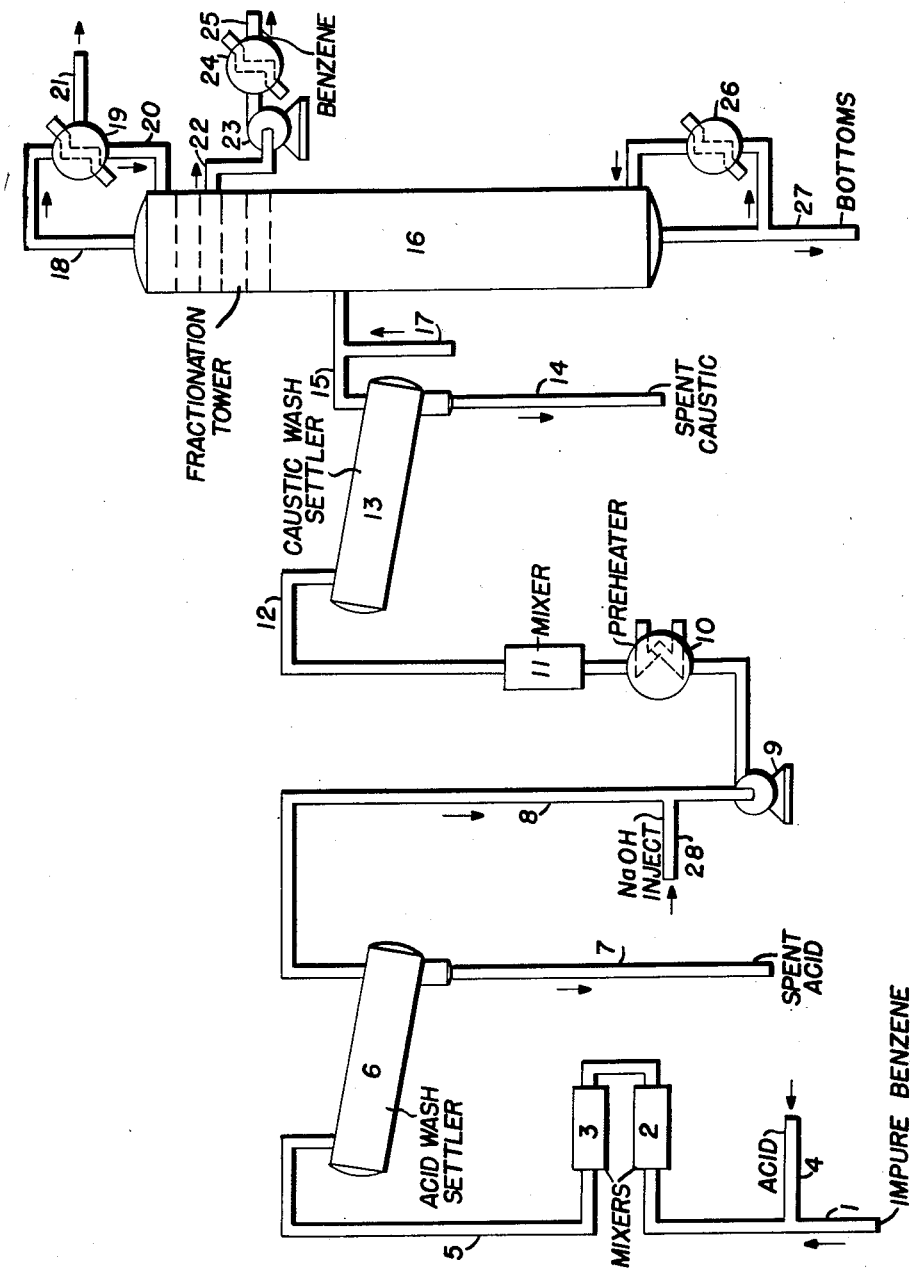

2,780,662

BENZENE PURIFICATION PROCESS BY TREATMENT WITH SULFURIC ACID

Samuel W. Wilson, Baton Rouge, La., assignor to Esso Research and Engineering Company, a corporation of Delaware Application May 11, 1953, Serial No. 354,192

3 Claims. (Cl. 260—674)

This invention relates to a method of producing extremely high purity benzene, of the order of 99+ mole percent purity from a benzene of about 94–97 mole percent purity, which is contaminated principally by $C_6$ unsaturated aliphatic hydrocarbons. It is concerned with a treatment by water-diluted sulfuric of certain relatively low acid strengths and in large proportion, followed by a caustic wash and distillation of the alkaline caustic-washed benzene.

The production of a chemically pure benzene on a commercial scale from refinery fractions is accomplished through the aid of the present invention. This is a significant accomplishment, considering how it is usually difficult to remove final small amounts of particular contaminants involved.

An important initial requirement in using the present method for obtaining the high purity benzene is that the treatment be given to a certain kind of impure benzene, i. e., benzene in which the amount of impurities is small, less than about 6 mole percent, and in which the impurities are substantially or nearly all olefinic hydrocarbons (alkenes and dienes). Such an impure benzene is produced by displacing or removing saturated hydrocarbon impurities. For example, the kind of impure benzene to be treated first can be given an extractive distillation with a selective solvent such as phenol, furfural, or the like, to free the benzene substantially of saturated hydrocarbon impurities, leaving the benzene of a purity in the range of 94 to 97 mole percent with impurities consisting substantially of olefinic hydrocarbons.

The next important requirement is to use an acid strength of 80 to 90 wt. percent $H_2SO_4$ in proper amounts so as to permit a single stage contacting to give practically complete purification. The proportion of this treating acid to the benzene contacted is in the range of 20 to 67 wt. percent.

In the past it has been known that various crude aromatic distillates, containing substantial amounts of saturated hydrocarbons were treated with relatively small proportions of high strength sulfuric acid, e. g., 95 to 98 weight percent $H_2SO_4$, in 2-stage and plural-stage acid treating systems to remove sufficient impurities for obtaining a commercial grade benzene. When such a treatment was given to the kind of impure benzene with which the present invention is concerned, a considerable number of difficulties were encountered.

With the method of present invention particularly applied to a benzene in which the impurities are mainly olefinic (alkenes and dienes), the relatively weaker aqueous sulfuric acid treating agent is used in a manner to be described in further detail. The acid sludge from the process of the present invention has improved characteristics in having a substantially lower viscosity, lower carbon content, and improved settling characteristics. The steps employed in this method are carried out with less apparatus than had to be used in the stronger acid treatments. The subsequent steps of caustic washing and distillation are simplified.

The method will be described with reference to the drawing which shows a preferred flow plan for the treating steps.

Referring to the drawing, the crude benzene of about 94–97 mole percent purity with about 6 to 3 mole percent unsaturated aliphatic hydrocarbon impurities is passed by line 1 through mixing zones 2 and 3. The sulfuric acid treating agent is admixed from line 4. The mixing means 2 and 3 may be in the form of orifice mixers or equivalent mixing means. On an industrial scale the mixing contact time is about 1.5 to 5 minutes.

The crude benzene mixed with the acid is passed by line 5 to the acid-wash settling drum 6. In the settling drum 6, the acid sludge should rapidly separate as a lower liquid phase layer leaving an upper layer of the acid-treated benzene as free of acid as possible. The acid sludge should be capable of being withdrawn from a bottom part of the settling drum 6 through line 7.

At this point of the process, where the acid-treated benzene has to be separated from the lower aqueous acid layer with adequate extraction of the reacted impurities by the aqueous acid, the proportion of the aqueous acid to the upper benzene layer is critical.

If inadequate amounts of the 80 to 90 wt. percent acid are used, the benzene is undertreated even at increased temperatures. With excessive aqueous acid, the impurities are suitably extracted. The proportion aqueous acid to the benzene treated should be from 20 to 67 wt. percent thereof.

The acid-treated benzene in the upper layer formed in the settling drum 6 is withdrawn through line 8 to be passed by pump 9 through a preheater 10, mixing column 11 and then line 12 into the upper part of the caustic wash settling drum 13. Caustic is injected through line 28.

In the caustic-wash settling drum 13, the spent aqueous caustic containing neutralized acidic bodies should settle quickly as a lower layer with the least possible amount of emulsion formation. The spent caustic is withdrawn from a bottom part of the caustic wash settling drum 13 by line 14. The alkaline benzene in the upper layer is withdrawn through line 15 and passed thereby into an intermediate part of the fractionating tower 16. Additional caustic may be added to the inlet line 15 through line 17.

The tower 16 may be provided with suitable number of fractionating plates, e. g., 50 plates. This tower is operated so as to take overhead benzene vapors through line 18 to the cooling condenser 19. A portion of condensed overhead benzene containing small or trace amounts of impurities is refluxed through line 20. The remaining overhead benzene of high purity is withdrawn through line 21. A high purity benzene product, e. g., of about 99+ mole percent benzene purity may be removed as an upper side stream through line 22 by pump 23 through cooler 24 to be sent to storage through line 25. At the bottom part of tower 16 is provided a reboiler 26 and a bottoms withdrawal line 27. The bottoms product will contain 2–3 mole percent benzene with small amounts of high boiling impurities.

With the operation using from 80 to 90% strength $H_2SO_4$ the benzene was made to meet specifications for chemical or reagent grade benzene, such as a maximum of 3 acid wash color according to A. S. T. M. procedure D–848–47.

Investigation showed that the most deleterious result on acid wash color was produced by the presence of very small quantities of diolefins and cyclo olefins, e. g., .001% of 1,5 hexadiene, .01% methyl cyclopentadiene or .01% cyclopentene. It is such $C_6$ diolefins and cyclic olefins which are evidently best eliminated from the benzene by treating the benzene with aqueous sulfuric acid having a maximum of 90% $H_2SO_4$. Therefore, it is important to remove particularly these contaminants when they are present in very small amounts. Contrary to what might be expected, the 80-90 weight percent $H_2SO_4$ was found more effective in completely eliminating such diolefins and cyclic olefins under comparative conditions, while at the same time, the alkylation and sludge losses for the 90% maximum acid treat is roughly about half such losses for the higher strength acid treat at comparative temperatures.

The critical requirements of 80 to 90 mole percent $H_2SO_4$ and 20 to 67 wt. percent of the acid based on the benzene charge apply specifically to the treatment of impure benzene containing the following kinds of impurities:

94-97 MOLE PERCENT BENZENE IMPURITIES

| Components: | Mole percent |
|---|---|
| Hexenes | 2-5 |
| $C_6$ dienes | 0.1-1 |
| Acetylenes | Trace-0.2 |
| Paraffins | Nil-0.5 |

Examples

Studies were made by treating 94.4, 95.4, and 96.1 mole percent of the typified impure benzene with 55, 60, 70, 75, 80, 85, 87.7, 90, 95, and 98 wt. percent $H_2SO_4$.

As the acid strength was lowered to below 80 wt. percent, the proportion of aqueous acid required to obtain specification acid wash color became very large. Nearly 600 pounds of 75 wt. percent $H_2SO_4$ had to be used compared to 100 pounds of 80 wt. percent $H_2SO_4$ per (42 gal.) barrel of the impure benzene at the same treating temperature for the same color improvement. Weaker acids failed to make specification products.

In using acid strength below 80 wt. percent more than 67 wt. percent of the aqueous acid based on the benzene charge had to be used to obtain specification benzene even at 200° F.; and in using such larger proportions of aqueous acid the upper sludge layer became semisolid, like the undesirable viscous lower layer sludge formed when the acid strength was above 90 wt. percent $H_2SO_4$.

The minimum acid treating temperature in using 80 to 90 wt. percent $H_2SO_4$ was 60° F. Raising the temperature gives some improvement, but above 150° F. the improvement is small while adverse effects of benzene losses by sulfonation are increased. The maximum treating temperature is 200° F. The acid-treating temperature is much easier to control in using the 80-90 wt. percent $H_2SO_4$ than in using higher acid strengths. It was observed that both undertreating with lower strength aqueous acid and high temperature treating contributed to sludge present in the benzene and acid phases. The stronger than 90 wt. percent acid made the sludge layer very viscous and caused emulsion difficulties in the caustic treatment. The use of stronger than 90 wt. percent acid made the sludge layer very viscous and of lower sulfuric acid content. This rendered the acid of no value for burning to recover $SO_2$, and ultimately $SO_3$, in a sulfuric acid fortification process because of the excess water and carbon dioxide produced in burning. While the viscosity of the sludge can be improved by use of additional strong acid, sulfonation resulted in increased water and carbon content of the sludge as well as in increased benzene losses. This was not true when the weaker acids were used. By using the proper strength and proportions of aqueous $H_2SO_4$ in the treatment the contact time can be minimized to within 1.5 to 5 minutes.

Suitable caustic washing of the acid treated benzene is carried out when the acid treated benzene is treated with 10 lbs. to 40 lbs. of 20% to 10% aqueous caustic per barrel and the mixture is heated to a temperature of about 280° to 300° F.

The purpose of the caustic wash treatment is to separate from the benzene the products of the acid treated impurities such as the sulfonates, sulfates and free acid so as to leave the benzene neutral or alkaline when it is separated from the spent caustic and fed into the rerun tower. In the rerun tower high boiling impurities carried in the caustic treated benzene, such as polymers and alkylated benzene, should remain in the bottoms or heavy ends. The tower can be operated to distill overhead a substantial amount of benzene with light end impurities at an overhead vapor temperature of about 176° F to 182° F.

I claim:

1. A process for purifying a crude benzene containing 94-97 mole percent benzene, 3-6 mole percent alkene and diene impurities and being substantially free of saturated hydrocarbons which comprises acid-treating said crude benzene with 20 to 67 wt. percent aqueous sulfuric acid that contains 80 to 90 weight percent $H_2SO_4$ to convert said impurities into substances readily separable from the benzene, said impurities and the sulfuric acid being reacted in the absence of other reactive substances at 60° to 200° F., separating the resulting acid-treated benzene in liquid phase as an upper layer from resulting used aqueous sulfuric acid containing the reacted olefinic impurities removed from the benzene, treating the separated acid-treated benzene with admixed aqueous alkali to remove acid impurities therefrom, separating the resulting liquid benzene as an upper layer from the aqueous alkali containing acidic impurities extracted from the benzene, then distilling the alkali-treated benzene to obtain a distillate containing 99+ mole percent benzene.

2. The process of purifying an impure benzene containing 94 to 97 mole percent benzene with 3 to 6 mole percent alkenes and dienes as its impurities which comprises treating said impure benzene at 60° to 200° F. with 20 to 67 weight percent of admixed aqueous sulfuric acid containing 80 to 90 weight percent $H_2SO_4$ to convert said impurities into substances which are extracted by the aqueous sulfuric acid without forming a thick sludge difficult to separate in the absence of any other reactant, separating the acid-treated benzene as an upper layer from the aqueous sulfuric acid containing impurities removed from the benzene by said acid, admixing aqueous caustic with a stream of the thus separated acid-treated benzene, heating the resulting mixture of aqueous caustic and benzene, settling the resulting mixture of benzene and aqueous caustic in a settling zone to separate a lower liquid phase of the caustic with acidic impurities therein removed from the upper benzene phase, then fractionally distilling the caustic treated benzene in a fractional distillation zone with caustic present to obtain a distillate containing 99+ mole percent benzene.

3. The process of purifying an impure benzene containing as impurities 2 to 5 mole percent hexenes, 0.1 to 1 mole percent $C_6$ dienes with a trace to 0.2 mole percent acetylene and nil to 0.5 mole percent paraffins, which comprises passing a stream of the impure benzene through a mixing zone into a settling zone, admixing with the impure benzene passed through said mixing zone 20 to 67 weight percent of aqueous sulfuric acid containing 80 to 90 weight percent $H_2SO_4$, maintaining the resulting benzene acid mixture at 60 to 150° F. to react the acid with unsaturated hydrocarbon impurities, other reactants being absent, separating the acid-benzene from the aqueous acid-containing impurities removed from the benzene in said settling zone wherein the acid forms a lower liquid layer, passing the upper layer of benzene from said settling zone in a stream, admixing with the acid treated benzene stream aqueous caustic to remove acidic impurities from the benzene, passing the benzene-caustic mixture through a heating and a mixing zone into a caustic wash settling zone, withdrawing spent caustic from said caustic wash settling zone, removing caustic-treated benzene as an upper liquid layer from said caustic wash settling zone to a fractional distillation zone, then fractionally distilling the caustic treated benzene in the presence of added caustic to obtain a distillate containing 99+ mole percent benzene.

References Cited in the file of this patent

UNITED STATES PATENTS

| | | |
|---|---|---|
| 2,244,164 | Lazar et al. | June 3, 1941 |
| 2,400,373 | Schutze | May 14, 1946 |
| 2,454,467 | Love | Nov. 23, 1948 |
| 2,569,216 | Arundale | Sept. 25, 1951 |

OTHER REFERENCES

Industrial & Engineering Chemistry, vol. 39 (1947), pages 1010–1018, pages 1016–1018 only needed. Article by Brandt et al.

World Petroleum, vol. 22 (1951), page 73 only needed (complete article pages 72–77).